(12) United States Patent
Tsubaki et al.

(10) Patent No.: US 11,987,293 B2
(45) Date of Patent: May 21, 2024

(54) VEHICLE BODY STRUCTURE (71) Applicant: KOBE STEEL, LTD., Hyogo (JP)

(72) Inventors: Shota Tsubaki, Kobe (JP); Kenichi Watanabe, Kobe (JP); Kazuya Yasui, Kobe (JP); Masatoshi Yoshida, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 430 days.

(21) Appl. No.: 17/299,089

(22) PCT Filed: Jan. 7, 2020

(86) PCT No.: PCT/JP2020/000136
§ 371 (c)(1),
(2) Date: Jun. 2, 2021

(87) PCT Pub. No.: WO2020/149170
PCT Pub. Date: Jul. 23, 2020

(65) Prior Publication Data
US 2022/0063731 A1 Mar. 3, 2022

(30) Foreign Application Priority Data
Jan. 16, 2019 (JP) ................. 2019-004880

(51) Int. Cl.
B62D 25/20 (2006.01)
B60K 1/04 (2019.01)
B62D 25/02 (2006.01)

(52) U.S. Cl.
CPC ............ B62D 25/2036 (2013.01); B60K 1/04 (2013.01); B62D 25/025 (2013.01); B60K 2001/0438 (2013.01)

(58) Field of Classification Search
CPC .................. B62D 25/2036; B60K 1/04; B60K 2001/0438; B60Y 2306/01
(Continued)

(56) References Cited

U.S. PATENT DOCUMENTS 4,582,357 A * 4/1986 Nakamura ................. B60J 5/06
49/213
9,145,176 B1 * 9/2015 Van Wyk ............. B62D 33/077
(Continued)

FOREIGN PATENT DOCUMENTS

CN 104443039 B 4/2016
DE 102004044925 B3 * 9/2005 ............. B62D 25/04
(Continued)

OTHER PUBLICATIONS

Notification of Transmittal of Translation of the International Preliminary Report on Patentability and Translation of Written Opinion of the International Searching Authority; PCT/JP2020/000136; mailed on Jul. 29, 2021.
(Continued)

Primary Examiner — Dennis H Pedder
(74) Attorney, Agent, or Firm — Studebaker & Brackett PC (57) ABSTRACT A vehicle body structure includes a battery disposed in a lower central part of a vehicle body, a hollow side sill extending in a vehicle front-rear direction and disposed outside the battery in a vehicle width direction, and a reinforcing member configuring at least a part of a continuous tubular structure formed inside the side sill. The continuous tubular structure has a shape in which a plurality of octagons are continuously arranged as viewed from the vehicle width direction.

8 Claims, 13 Drawing Sheets (58) Field of Classification Search
USPC ........ 296/209, 29, 30, 204, 23.01, 3, 187.12
See application file for complete search history.

(56) References Cited

U.S. PATENT DOCUMENTS

| | | | |
|---|---|---|---|
| 9,493,190 B1* | 11/2016 | Alwan | B62D 25/025 |
| 9,725,118 B2* | 8/2017 | Alwan | B60K 1/04 |
| 10,220,882 B2 | 3/2019 | Ayukawa | |
| 10,259,506 B2 | 4/2019 | Ayukawa | |
| 10,370,040 B1* | 8/2019 | Cooper | B62D 21/157 |
| 10,723,385 B2 | 7/2020 | Ayukawa | |
| 10,926,804 B2* | 2/2021 | Yang | B62D 25/025 |
| 2014/0203592 A1* | 7/2014 | Nagwanshi | B60R 19/03 293/121 |
| 2014/0265443 A1 | 9/2014 | Meaige et al. | |
| 2017/0072884 A1* | 3/2017 | Zannier | B60R 19/18 |
| 2017/0073020 A1 | 3/2017 | Ayuzawa et al. | |
| 2018/0065677 A1* | 3/2018 | Tutzer | B62D 21/157 |
| 2018/0148099 A1 | 5/2018 | Ayukawa | |
| 2018/0148106 A1 | 5/2018 | Ayukawa | |
| 2019/0168809 A1 | 6/2019 | Ayukawa | |

FOREIGN PATENT DOCUMENTS

| | | |
|---|---|---|
| JP | 2013-136275 A | 7/2013 |
| JP | 2013-252816 A | 12/2013 |
| JP | 2014-091422 A | 5/2014 |
| JP | 2015-063207 A | 4/2015 |
| JP | 2018-090020 A | 6/2018 |
| JP | 2018-090021 A | 6/2018 |
| WO | 2014069373 A1 | 5/2014 |
| WO | 2015129110 A1 | 9/2015 |

OTHER PUBLICATIONS

The extended European search report issued by the European Patent Office on Aug. 29, 2022, which corresponds to European Patent Application No. 20740886.5-1009 and is related to U.S. Appl. No. 17/299,089.

* cited by examiner

VEHICLE BODY STRUCTURE

CROSS-REFERENCE TO RELATED APPLICATIONS

This is a national phase application in the United States of International Patent Application No. PCT/JP2020/000136 with an international filing date of Jan. 7, 2020, which claims priority of Japanese Patent Application No. 2019-004880 filed on Jan. 16, 2019 the contents of which are incorporated herein by reference.

TECHNICAL FIELD

The present invention relates to a vehicle body structure.

BACKGROUND ART

Electric vehicles are required to have higher collision safety performance than general fuel vehicles from a viewpoint of battery protection and the like. In an electric vehicle, in order to secure a cruising distance, a battery is widely arranged on the entire underfloor surface of a vehicle compartment in many cases, and thus high collision safety performance is particularly required at the time of side collision (hereinafter, also referred to as side collision performance). In other words, when an object such as a pole collides with a vehicle side part due to spinning of the vehicle body or the like, it is necessary to protect the vehicle compartment and the battery from damage.

For example, JP 2018-90020 A and JP 2018-90021 A disclose a lower vehicle body structure capable of suppressing deformation of the vehicle compartment and improving the side collision performance of a vehicle. In the lower vehicle body structure, in order to obtain high side collision performance, a reinforcing member is disposed in a columnar member on a lower side part of the vehicle body called a side sill to improve strength and collision energy absorbing performance of the side sill.

Patent Document 1: JP 2018-90020 A
Patent Document 2: JP 2018-90021 A

SUMMARY OF THE INVENTION

In the lower vehicle body structures of JP 2018-90020 A and JP 2018-90021 A, the reinforcing member has a closed cross section as viewed from a vehicle front-rear direction, and extends in substantially the same direction as the side sill. In such a reinforcing member, when a vehicle side part receives a force, the reinforcing member also receives the force from the side part. Therefore, a high tensile stress is generated in a portion of the reinforcing member on the inner side of the vehicle body in the longitudinal direction, and bending fracture may occur. When the bending fracture occurs in the reinforcing member, reaction force is not generated. Therefore, the collision energy cannot be absorbed, and the side collision performance deteriorates. In addition, such a reinforcing member easily falls laterally (fall in the vehicle height direction) when the reinforcing member collides with an object such as a pole. When the reinforcing member falls laterally, the reaction force rapidly decreases, and the side collision performance degrades.

An object of the present invention is to provide a vehicle body structure having high side collision performance.

The present invention provides a vehicle body structure that includes a battery disposed in a lower central part of a vehicle body, a side sill extending in a vehicle front-rear direction and disposed outside the battery in a vehicle width direction, the side sill being hollow, and a reinforcing member configuring at least a part of a continuous tubular structure formed inside the side sill. The continuous tubular structure has a shape in which a plurality of closed cross sections with polygonal shape are continuously arranged as viewed from the vehicle width direction.

According to this configuration, the continuous tubular structure in which the plurality of polygonal closed cross sections are continuously arranged as viewed from the vehicle width direction is formed inside the side sill. In general, the tubular structure is easily bent and deformed by a load on the side part, but is strong against a load in the axial direction. In the above arrangement configuration, a side collision load on the vehicle body is a load in the axial direction in the tubular structure. Therefore, at the time of side collision of the vehicle body, it is possible to reduce the possibility that the reinforcing member breaks due to bending deformation or lateral fall, and a reaction force of the reinforcing member can be improved. Therefore, since the collision energy absorbing performance can be improved, the vehicle compartment and the battery can be safely protected. Accordingly, the side collision performance required for electric vehicles can be secured.

The continuous tubular structure may be arranged in a single row as viewed from the vehicle width direction.

According to this configuration, since the continuous tubular structure is configured in a single row, the maximum size of the polygonal closed cross section can be secured in a narrow space inside the side sill. For example, the polygonal closed cross section can be flattened in the longitudinal direction to extend the lateral width. Conversely, the polygonal closed cross section can be flattened in the lateral direction to shorten the lateral width. Therefore, by securing the maximum size of the closed cross section, the closed cross section can be easily crushed while maintaining a large reaction force to secure the maximum stretchability of the reinforcing member. As a result, the collision energy absorbing performance can be improved to improve the side collision performance.

The reinforcing member may form the plurality of closed cross sections by a single component.

According to this configuration, since the reinforcing member can be disposed in the side sill after a desired closed cross section is formed by the reinforcing member, the vehicle body structure can be easily designed. Accordingly, a suitable shape can be easily designed to obtain desired side collision performance.

Each of the plurality of closed cross sections may be a polygon of a hexagon or more.

According to this configuration, since a polygon of a hexagon or more has more bending points than a quadrangle or the like and is easily deformed, the stretchability of the reinforcing member can be improved. By securing the stretchability of the reinforcing member, bending fracture of the reinforcing member can be suppressed to improve the side collision performance.

Each of the plurality of closed cross sections may be an even-numbered polygon.

According to this configuration, when the reinforcing member is attached to other member such as the side sill, it is easy to secure a flat portion facing other member. Accordingly, attachability of the reinforcing member can be improved.

The reinforcing member may be an extruded material of 6000 series or 7000 series aluminum alloy.

According to this configuration, it is possible to secure high material strength and elongation to absorb collision energy by the reinforcing member. Since high material strength and elongation are required to absorb collision energy, a metal material such as an aluminum material is suitable. When the reinforcing member is formed of a resin material, the material strength is insufficient, and the reinforcing member may easily bend and break. In particular, an aluminum material is suitable as an extruded material, and also shows good manufacturability.

The reinforcing member may be formed by bonding a plate member of an aluminum alloy or steel.

According to this configuration, the reinforcing member can be made of a plate member. Therefore, the reinforcing member can be easily manufactured to improve its versatility. Here, bonding refers to a broad aspect including welding and mechanical joining.

The reinforcing member may be bonded to an inner surface of the side sill, and the continuous tubular structure may be configured with the reinforcing member and the side sill.

According to this configuration, as compared with the case of configuring the continuous tubular structure with the reinforcing member alone, a design restriction on the reinforcing member is reduced. For example, the reinforcing member may be formed by bending a single plate member into a continuous hat shape, and this reinforcing member may be bonded to a flat inner surface of the side sill to form the continuous tubular structure. Here, bonding refers to a broad aspect including welding and mechanical joining.

According to the present invention, in a vehicle body structure, since a reaction force of a reinforcing member is improved by suitably disposing the reinforcing member inside a side sill, side collision performance can be improved.

MODE FOR CARRYING OUT THE INVENTION

Hereinafter, an embodiment of the present invention will be described with reference to the accompanying drawings. The drawings are all schematically illustrated, and the following description is merely exemplary in nature and is not intended to limit the present invention, its application, or its use. In addition, the drawings are schematic, and ratios of dimensions and the like may be different between the drawings.

Figure 1:
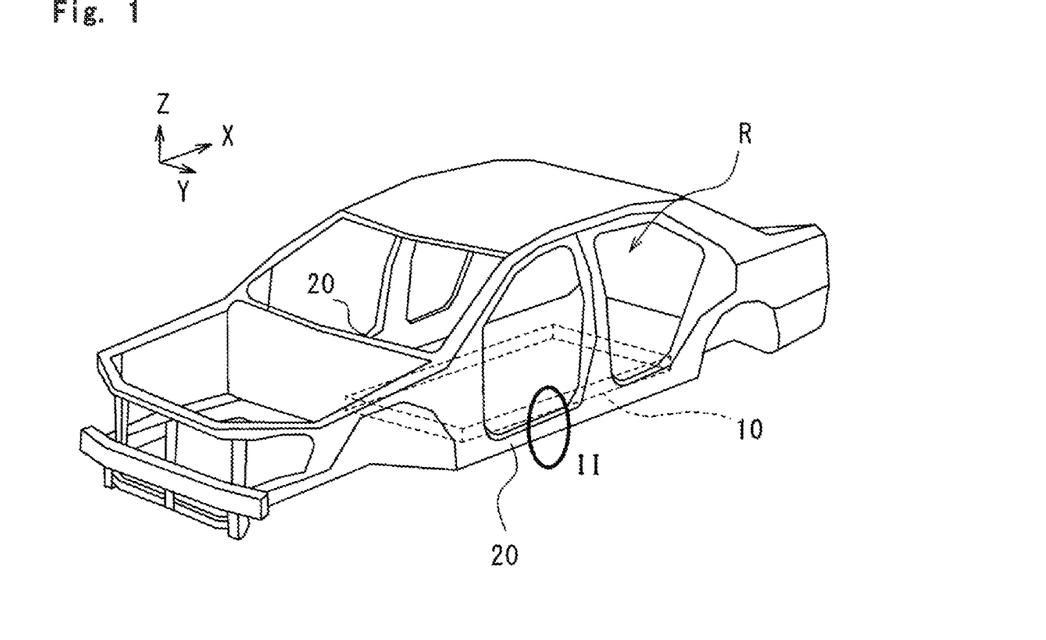
FIG. 1 is a perspective view illustrating a vehicle body structure according to an embodiment of the present invention.

With reference to FIG. 1, in a vehicle body structure of the present embodiment, a battery 10 for propulsion is disposed in a lower central part of a vehicle body. In other words, the vehicle body structure of the present embodiment is for an electric vehicle equipped with the battery 10. The battery 10 is schematically illustrated including a protective case and the like, and is disposed on an entire underfloor surface of a vehicle compartment R. The present embodiment will describe below the vehicle body structure having high side collision performance in which the vehicle compartment R and the battery 10 are protected from damage when an object such as a pole collides with a vehicle side part (i.e., side collision) due to spinning of the vehicle body or the like.

In FIG. 1, a lateral direction of the vehicle body (specifically, leftward) is indicated by reference symbol Y, a rearward of the vehicle body is indicated by reference symbol X, and upward of the vehicle body is indicated by reference symbol Z. In other words, the vehicle width direction is indicated by a direction Y and its opposite direction, the vehicle front-rear direction is indicated by a direction X and its opposite direction, and a vehicle height direction is indicated by a direction Z and its opposite direction. These directions are also the same in the drawings from FIG. 2.

A hollow side sill 20 extending in the vehicle front-rear direction is disposed outside the battery 10 in the vehicle width direction. A pair of side sills 20 are disposed along lower portions on both sides of the vehicle compartment R. The side sill 20 is a member also referred to as a rocker in the vehicle body structure.

Figure 2:
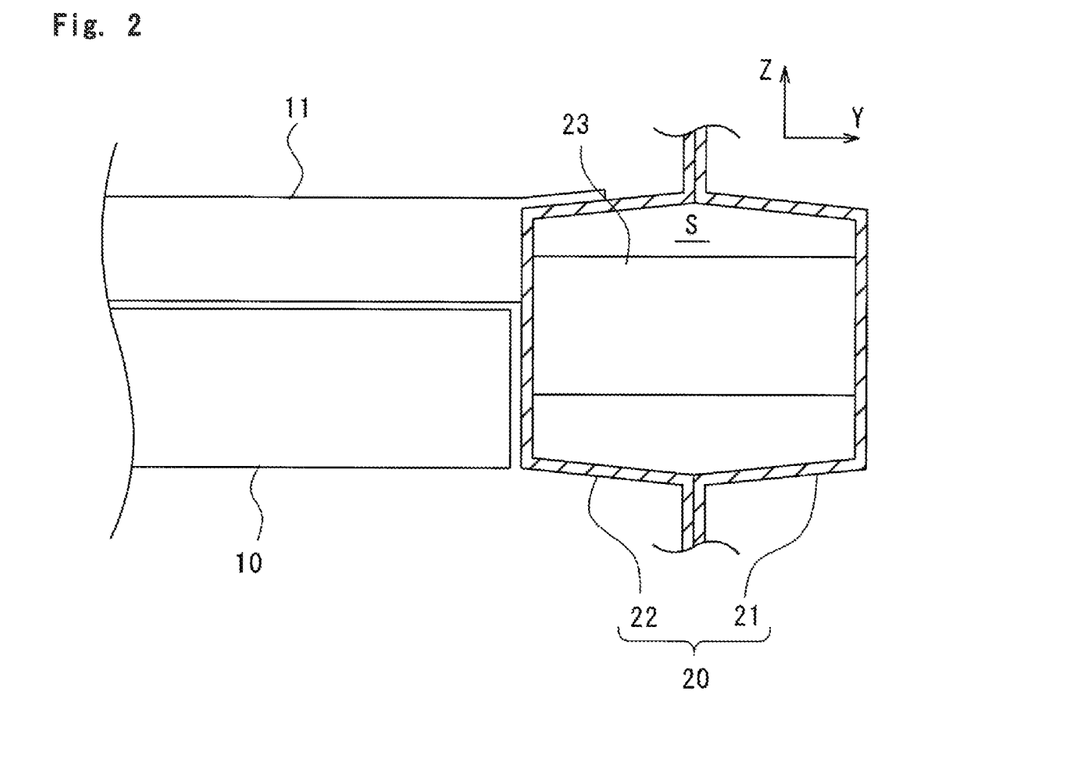
FIG. 2 is a cross-sectional view perpendicular to the vehicle front-rear direction illustrating a side sill portion indicated by an ellipse II in FIG. 1.

With reference to FIG. 2, a plurality of cross members 11 extending in the vehicle width direction are disposed above the battery 10. The pair of side sills 20 are connected to each other at the upper portion by the plurality of cross members 11. In FIG. 2, only one of the pair of side sills 20 is shown.

The side sill 20 of the present embodiment is configured by bonding an outer member 21 disposed outside in the vehicle width direction and an inner member 22 disposed inside in the vehicle width direction. Both the outer member 21 and the inner member 22 are, for example, steel plate members. Both the outer member 21 and the inner member 22 are bent into a hat shape, and are attached and welded so as to form a hollow space S. The reinforcing member 23 is disposed in the space S.

The reinforcing member 23 has one end in contact with the outer member 21 and the other end in contact with the inner member 22 in the vehicle width direction. In the vehicle height direction, the reinforcing member 23 is disposed across the cross member 11 and the battery 10. As a result, even when an object such as a pole makes a side collision with the vehicle body, a side collision load can be dispersed from the side sill 20 to the battery 10 and the cross member 11.

Figure 3:
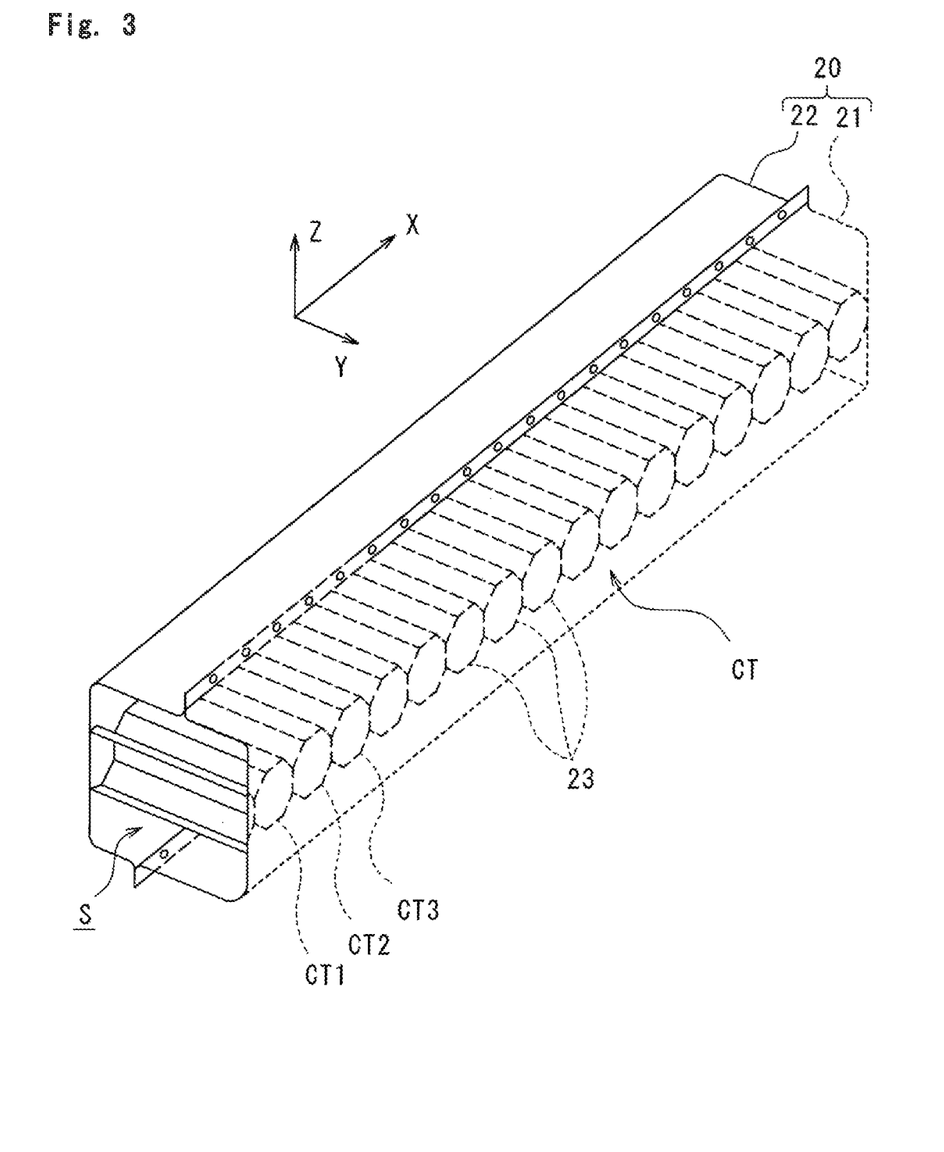
FIG. 3 is a perspective view of the side sill portion in which an outer member is made transparent.

With reference to FIG. 3, the reinforcing member 23 forms a continuous tubular structure CT inside the side sill 20. The continuous tubular structure CT is configured by continuously arranging in the vehicle front-rear direction a plurality of tubular bodies CT1, CT2, CT3, and so on extending in the vehicle width direction. As viewed from the vehicle width direction, the continuous tubular structure CT has a shape in which a plurality of polygonal closed cross sections are continuously arranged in the vehicle front-rear direction.

In the present embodiment, the reinforcing member 23 is an extruded material of 6000 series or 7000 series aluminum alloy, and the continuous tubular structure CT is integrally formed. In other words, the reinforcing member 23 is configured as a single component. However, the material of the reinforcing member 23 is not limited to the aluminum alloy extruded material, and the reinforcing member 23 may be made of, for example, steel.

Figure 4:
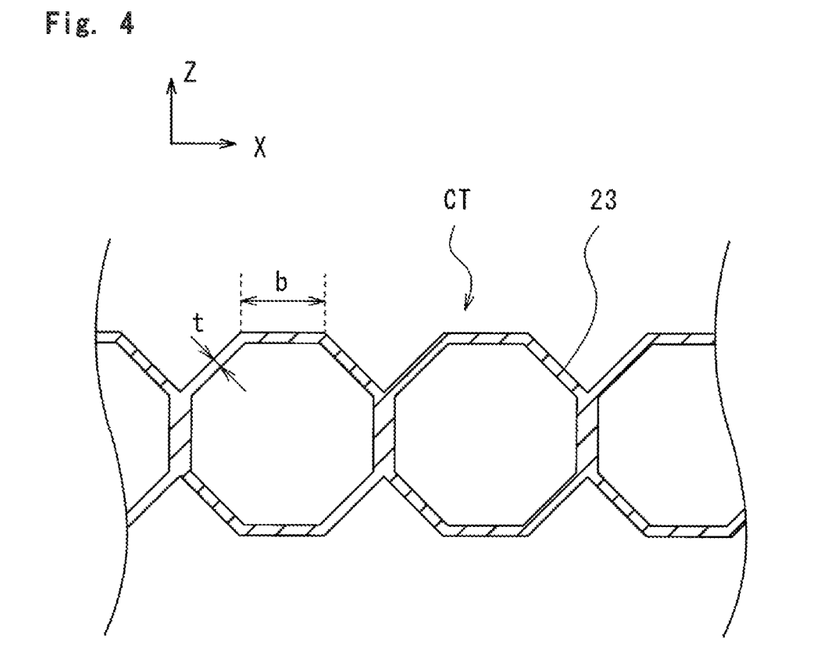
FIG. 4 is a cross-sectional view perpendicular to the vehicle width direction illustrating a reinforcing member arranged in a single row.

With reference to FIG. 4, in the present embodiment, regular octagonal closed cross sections are arranged in a single row in the continuous tubular structure CT. This single row arrangement is configured such that adjacent regular octagons share one side with each other. The reinforcing member 23 has a plate thickness t, and one side of the regular octagon has a length b. Considering an efficiency of collision energy absorption on each side of the polygon based on Karman's formula, the plate thickness t and the length b of the reinforcing member 23 preferably satisfy the following Formula (1).

[Formula 1]

$$\left(\frac{t}{b}\right)^2 > 0.18\frac{\sigma y}{E} \quad (1)$$

σy: yield stress of reinforcing member
E: Young's modulus of reinforcing member

As an example of dimensions of the reinforcing member 23 satisfying the above Formula (1), in a case where the reinforcing member 23 is made of an aluminum alloy having Young's modulus E=68 GPa and yield stress σy=200 MPa, it is possible to set one side of a regular octagon to length b=87 mm with plate thickness t=2 mm. Similarly, when plate thickness t=3 mm, one side of the regular octagon can be length b=130 mm. In addition, in a case where the reinforcing member 23 is made of steel having Young's modulus E=210 GPa and yield stress σy=700 MPa, it is possible to set one side of a regular octagon to length b=82 mm with thickness t=2 mm. Similarly, when plate thickness t=1.6 mm, one side of the regular octagon can be length b=65 mm.

The shape of each closed cross section of the continuous tubular structure CT is not limited to the regular octagon, but is preferably a polygon of hexagon or more. More preferably, the continuous tubular structure CT has a single-row structure, the shape of each closed cross section is an even-numbered polygon of a hexagon or more, and the side surface of the continuous tubular structure CT is parallel to an XY plane in FIG. 3.

Figure 5:
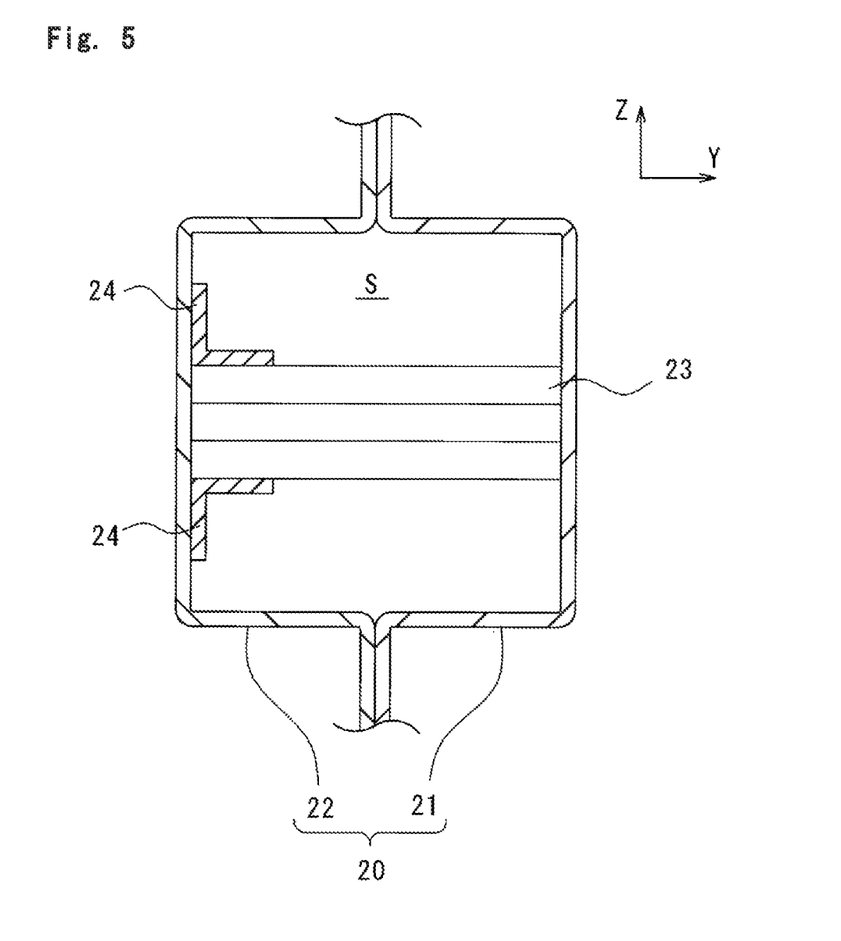
FIG. 5 is a cross-sectional view perpendicular to the vehicle front-rear direction illustrating the side sill portion for showing a method for fixing the reinforcing member.

A method for fixing the reinforcing member 23 will be described with reference to FIG. 5. The reinforcing member 23 is fixed to an inner surface of the side sill 20. In the present embodiment, for example, the reinforcing member 23 is fixed by an L-shaped bracket 24. Specifically, an inner end of the reinforcing member 23 in the vehicle width direction is fixed to the inner member 22 by the bracket 24. Alternatively, an outer end of the reinforcing member 23 in the vehicle width direction may be fixed to the outer member 21. The bracket 24 is disposed in the vehicle height direction above and below the reinforcing member 23 at both ends in the vehicle width direction. For bonding the bracket 24 and the side sill 20 and bonding the bracket 24 and the reinforcing member 23, flow drill screw (FDS), self-piercing rivet (SPR), spot welding, arc welding, brazing, or the like can be adopted. In FIGS. 2 and 3, illustration of the bracket 24 is omitted.

Figure 6:
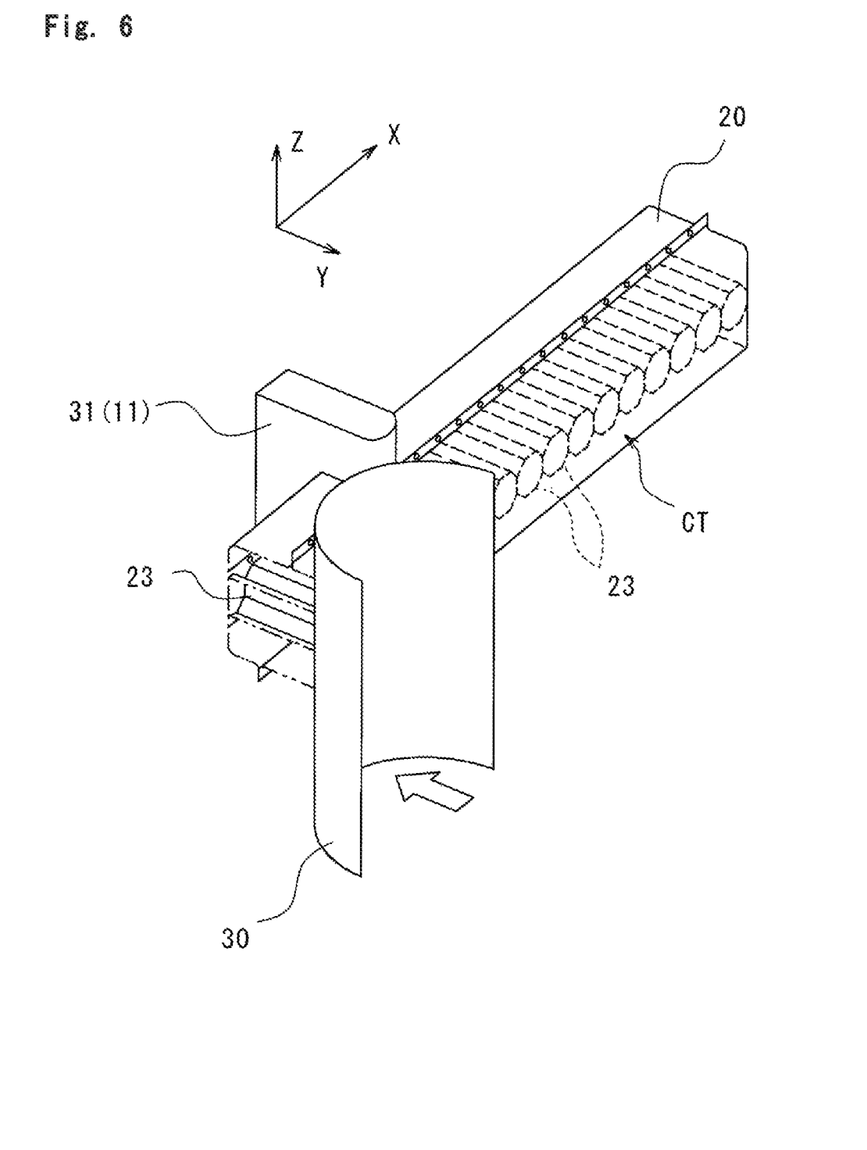
FIG. 6 is a schematic perspective view illustrating a simulation method for a side collision of the vehicle body structure according to the embodiment.
Figure 7:
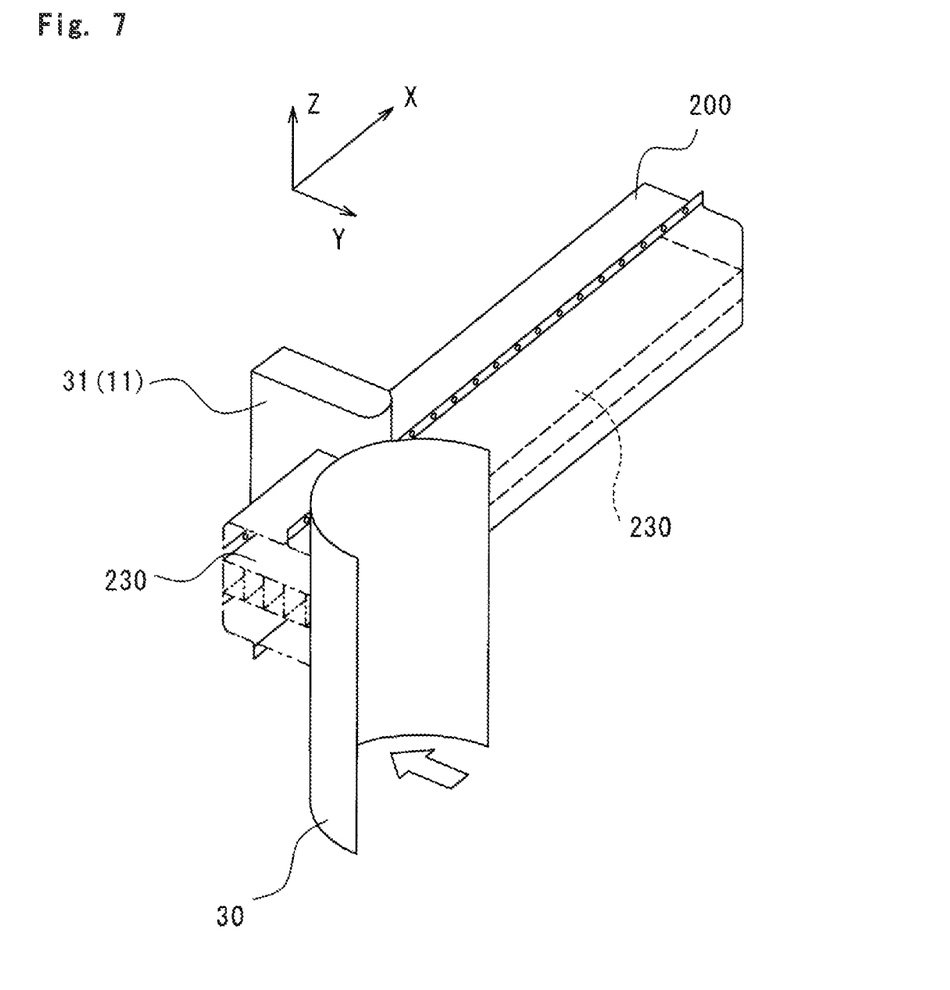
FIG. 7 is a schematic perspective view illustrating a simulation method for a side collision of a vehicle body structure according to a comparative example.

With reference to FIGS. 6 and 7, the side collision performance of the side sill 20 in the vehicle body structure of the present embodiment will be described. In order to compare the side collision performance of the side sill 20 in the vehicle body structure of the present embodiment (see FIG. 6) with the side collision performance of a side sill 200 of a comparative example (see FIG. 7), the inventors performed a simulation in which a pole 30 collides from the side. In the simulation, a part of each of the side sills 20 and 200 was fixed by a support member 31 simulating the cross member 11, and a state in which the pole 30 was collided from the outside in the vehicle width direction was reproduced. In FIGS. 6 and 7, the side sills 20 and 200 are cut to illustrate the inside of the side sills 20 and 200 (see a two-dot chain line), but actually, the side sills 20 and 200 further extend in the vehicle front-rear direction. Specifically, only a half of the side sills 20 and 200 in the positive direction from the center in the X direction of the side sills 20 and 200 is indicated. In addition, only an inner half of the pole 30 in the vehicle width direction is illustrated.

FIG. 6 illustrates the side sill 20 of the present embodiment, and FIG. 7 illustrates the side sill 20 of the comparative example. A difference between the two is only the configuration of the reinforcing member 23 in the side sill 20. The thickness of the reinforcing member 23 of the present embodiment in FIG. 6 is uniform and 3 mm. A reinforcing member 230 of the comparative example in FIG. 7 has a closed cross section as viewed from the vehicle front-rear direction, and extends in the same direction as the side sill 200. The shape of the closed cross section is a rectangle, and the rectangles are continuously arranged in a single row in the vehicle width direction. The thickness of the reinforcing member 23 is 4 mm for an upper wall and a lower wall perpendicular to the vehicle height direction, and 2 mm for a side wall and a partition wall perpendicular to the vehicle width direction.

Results of simulation under the above conditions are shown in Table 1 below. Output values of the simulation for each of the reinforcing members 23 and 230 are an average reaction force in the vehicle width direction, an energy absorption amount (EA amount), weight, an EA amount per unit weight (EA amount/kg), and the presence or absence of lateral fall. In the comparison of the average reaction force, the EA amount, and the EA amount/kg, the larger the values are, the more preferable the results are, and a lighter weight is more preferable. It is preferable that lateral fall does not occur.

TABLE 1

|  | Average reaction force | EA amount | Weight | EA amount/kg | Lateral fall |
|---|---|---|---|---|---|
| Present Embodiment | 389 kN | 39.0 kJ | 11.4 kg/m | 3.4 kJ/(kg/m) | None |
| Comparative Example | 323 kN | 32.4 kJ | 12.3 kg/m | 2.6 kJ/(kg/m) | Yes |

With reference to Table 1, the present embodiment shows a larger numerical value than the comparative example in any of the average reaction force, the EA amount, and the EA amount/kg. The weight of the present embodiment is lighter than that of the comparative example. Lateral fall does not occur in the present embodiment but occurs in the comparative example. Therefore, the present embodiment shows more preferable results than the comparative example in all items. When the present embodiment and the comparative example have the same EA amount, the size in the vehicle width direction can be reduced by 22% in the present embodiment as compared with the comparative example.

Hereinafter, functions and effects of the present embodiment will be described.

According to the present embodiment, as illustrated in FIG. 3, the continuous tubular structure CT, in which a plurality of polygonal closed cross sections are continuously arranged as viewed from the vehicle width direction, is formed inside the side sill 20. In general, the tubular structure is easily bent and deformed by a load on the side part, but is strong against a load in the axial direction. In the present embodiment, the side collision load on the vehicle body is a load in each central axis direction of the tubular bodies CT1, CT2, CT3, and so on in the continuous tubular structure CT. Therefore, at the time of the side collision of the vehicle body, the possibility that the reinforcing member 23 is bent and deformed can be reduced, and the reaction force of the reinforcing member 23 can be increased. Accordingly, since the collision energy absorbing performance can be improved, the vehicle compartment R (see FIG. 1) and the battery 10 (see FIG. 1) can be safely protected, and the side collision performance required for electric vehicles can be secured.

Figure 8:
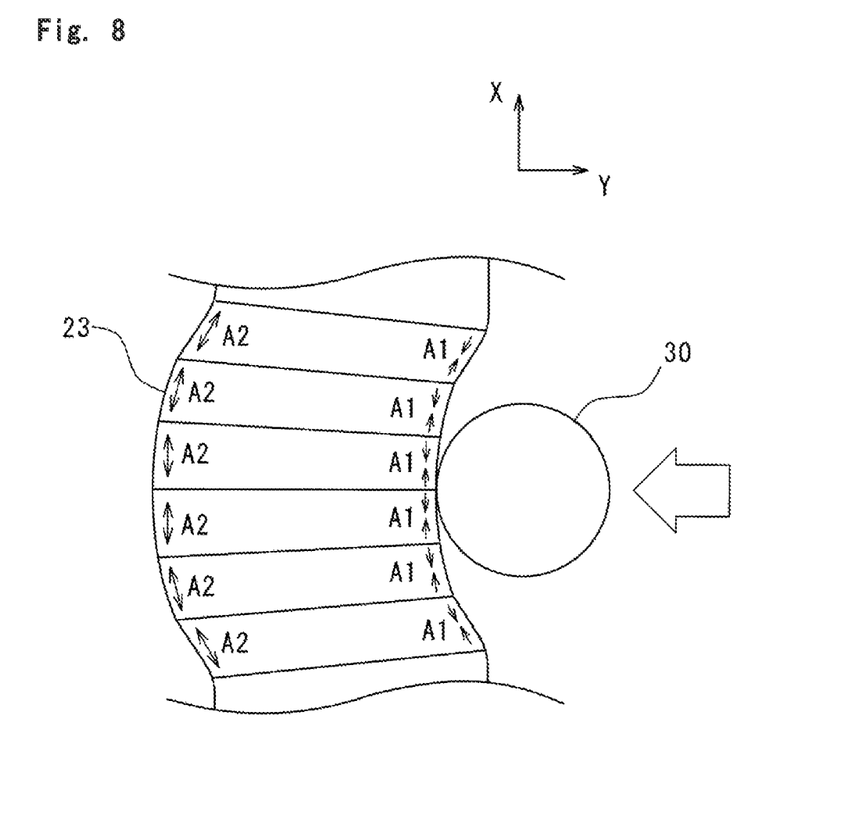
FIG. 8 is a plan view illustrating deformation of the reinforcing member by a side collision against a pole in FIG. 6.

Since the continuous tubular structure CT is configured in a single row, the maximum size of the polygonal closed cross section can be secured in the narrow space S in the side sill 20. For example, the polygonal closed cross section (in the present embodiment, a regular octagon) can be flattened in the longitudinal direction to extend the lateral width. Conversely, the polygonal closed cross section can be flattened in the lateral direction to shorten the lateral width. Therefore, by securing the maximum size of the closed cross section, the closed cross section can be easily crushed to secure the maximum stretchability of the reinforcing member 23. More specifically, with reference to FIG. 8, when the pole 30 laterally collides with the vehicle body, an outer end of the reinforcing member 23 in the vehicle width direction contracts in the vehicle front-rear direction along an object such as the pole (see an arrow A1), while the inner end of the reinforcing member 23 in the vehicle width direction extends in the vehicle front-rear direction (see an arrow A2). As a result, the collision energy absorbing performance can be improved to improve the side collision performance.

Since the reinforcing member 23 is configured as a single component, the reinforcing member 23 can be disposed in the side sill 20 after a desired closed cross section is formed in the reinforcing member 23. Therefore, the vehicle body structure can be easily designed. Accordingly, a suitable shape can be easily designed to obtain desired side collision performance.

In the present embodiment, the closed cross section of the reinforcing member 23 is formed in a regular octagon. Since a polygon of a hexagon or more has many bending points and is easily deformed as compared with a quadrangle or the like, the stretchability of the reinforcing member 23 can be improved. By securing the stretchability of the reinforcing member 23, bending fracture of the reinforcing member 23 can be suppressed to improve the side collision performance.

In the present embodiment, the closed cross section of the reinforcing member 23 is formed in an even-numbered polygon (specifically, a regular octagon). As a result, when the reinforcing member 23 is attached to other member such as the side sill, it is easy to secure a flat portion facing other member. Accordingly, attachability of the reinforcing member 23 can be improved.

Since the reinforcing member 23 is an extruded material of 6000 series or 7000 series aluminum alloy, a high material strength and elongation for absorbing collision energy can be secured in the reinforcing member 23. Since high material strength and elongation are required to absorb collision energy, a metal material such as an aluminum material is suitable. When the reinforcing member 23 is formed of a resin material, the material strength is insufficient, and the reinforcing member 23 may easily bend and break. In particular, an aluminum material is suitable as an extruded material, and also shows good manufacturability.

The method and structure for fixing the reinforcing member 23 are not limited to the above embodiment, and can be variously changed. Hereinafter, various modifications of the reinforcing member 23 will be described.

(First Modification)

Figure 9:
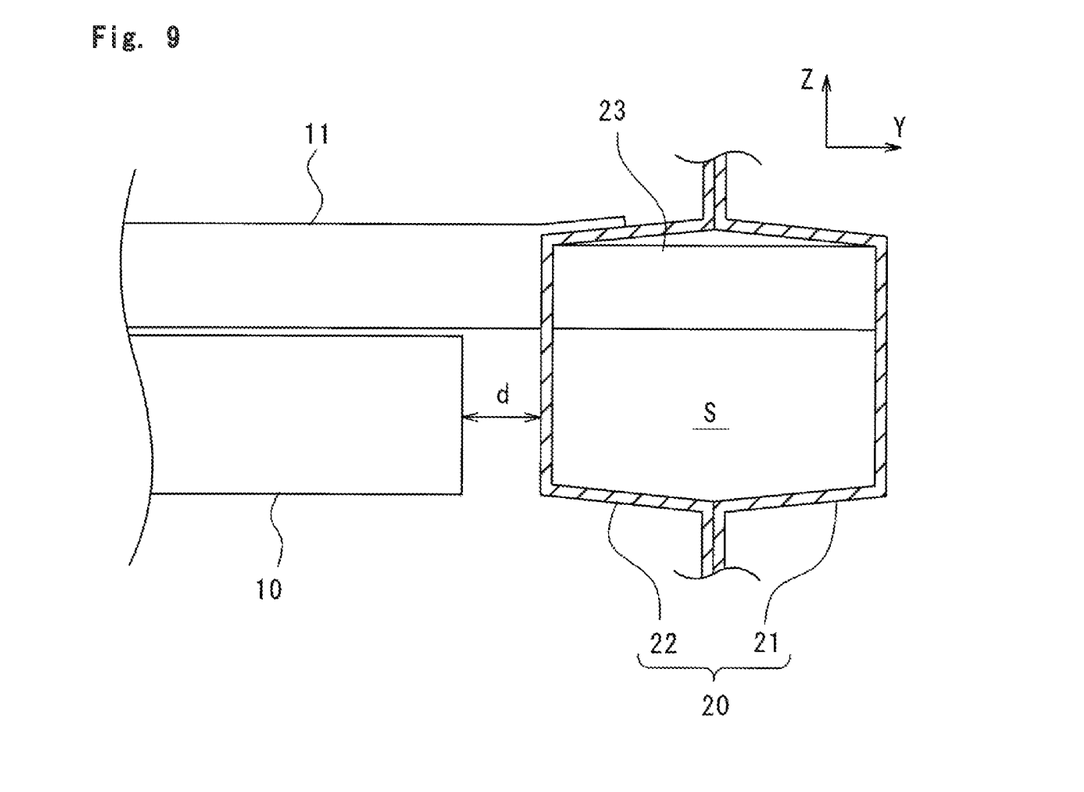
FIG. 9 is a cross-sectional view perpendicular to the vehicle front-rear direction illustrating a side sill portion in a first modification of the reinforcing member.
Figure 10:
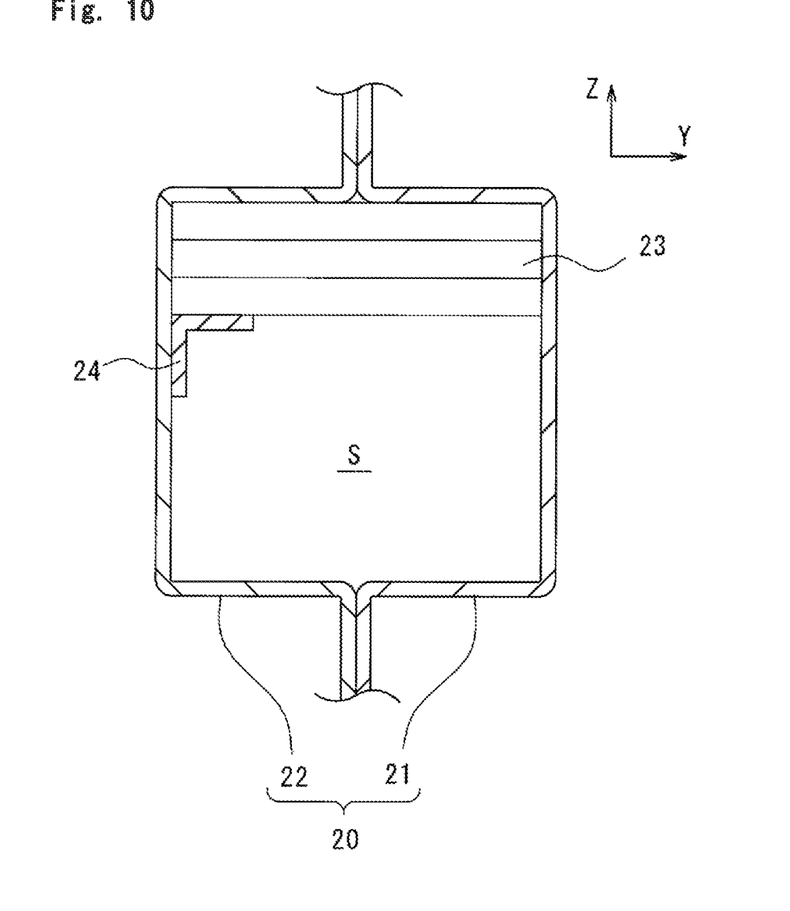
FIG. 10 is a cross-sectional view of the side sill portion in the first modification of the reinforcing member.

With reference to FIGS. 9 and 10, in the first modification, the reinforcing member 23 is disposed on the upper portion inside the side sill 20. Specifically, the upper surface of the reinforcing member 23 is disposed in contact with the inner surface of the side sill 20, and the upper surface of the reinforcing member 23 and the inner surface of the inner member 22 are bonded by spot welding or the like. An L-shaped bracket 24 is disposed below an inner end of the reinforcing member 23 in the vehicle width direction, and the inner end of the reinforcing member 23 in the vehicle width direction is fixed to the inner member 22 by the bracket 24. Alternatively, an outer end of the reinforcing member 23 in the vehicle width direction may be fixed to the outer member 21. In FIG. 9, illustration of the bracket 24 is omitted.

The battery 10 is disposed slightly inside in the vehicle width direction as compared with the above embodiment, and is disposed with a gap d in the vehicle width direction with respect to the side sill 20 so that the battery 10 does not come into contact with the side sill even when the side sill 20 is slightly deformed. Specifically, in the vehicle height direction, the reinforcing member 23 and the battery 10 are not disposed so as to overlap each other, and the reinforcing member 23 and the cross member 11 are disposed so as to be aligned with each other. Therefore, in the side collision of the vehicle body, no force is applied from the reinforcing member 23 to the battery 10, and the force is transmitted to the cross member 11.

According to the present modification, no force is applied to the battery 10 when a side collision load is applied. Therefore, the battery 10 can be reliably protected. In addition, since the upper surface of the reinforcing member 23 is directly bonded to the inner surface of the side sill 20, the number of brackets 24 to be used can be reduced as compared with the above embodiment.

(Second Modification)

Figure 11:
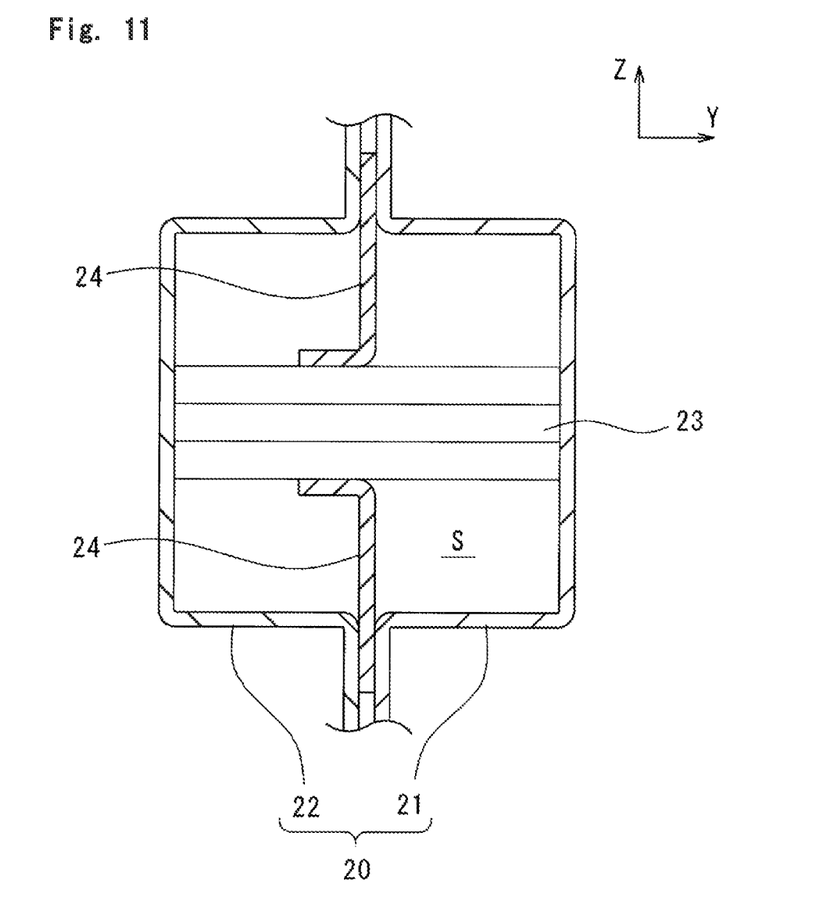
FIG. 11 is a cross-sectional view perpendicular to the vehicle front-rear direction illustrating a side sill portion in a second modification of the reinforcing member.

With reference to FIG. 11, in the present modification, a central portion of the reinforcing member 23 in the vehicle width direction is supported and fixed by the L-shaped bracket 24. One end of the bracket 24 is sandwiched between the outer member 21 and the inner member 22 of the side sill 20, and is bonded thereto by spot welding or the like. The other end of the bracket 24 is bonded to the reinforcing member 23 by spot welding or the like.

According to the present modification, it is possible to support the central portion of the reinforcing member 23 in the vehicle width direction where bending fracture is likely to occur. Therefore, bending fracture can be more reliably prevented.

(Third Modification)

Figure 12:
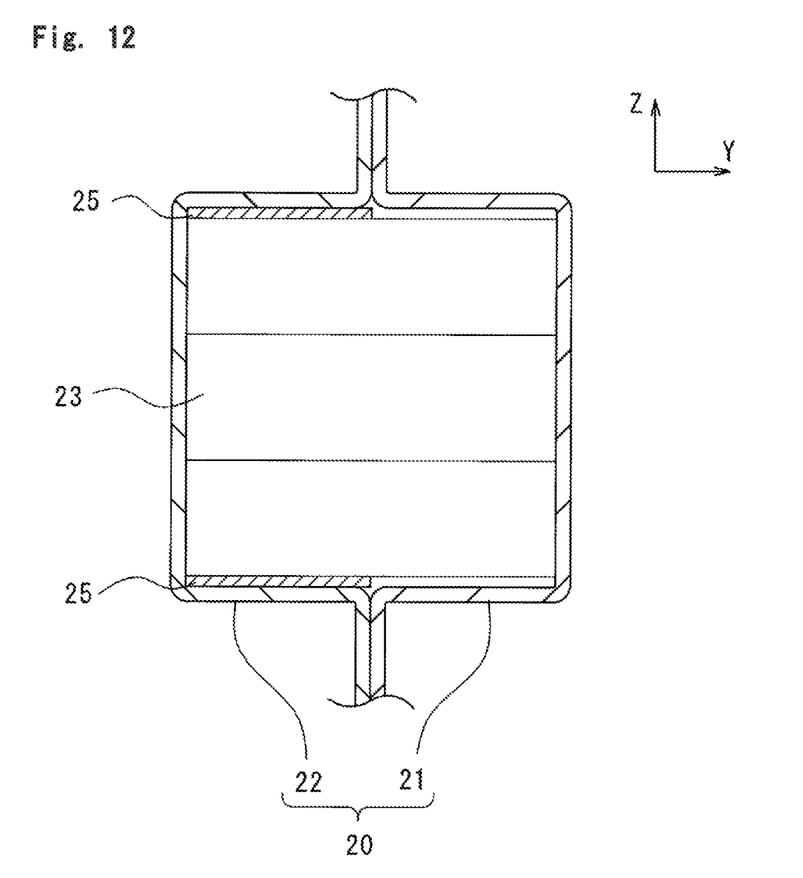
FIG. 12 is a cross-sectional view perpendicular to the vehicle front-rear direction illustrating a side sill portion in a third modification of the reinforcing member.
Figure 13:
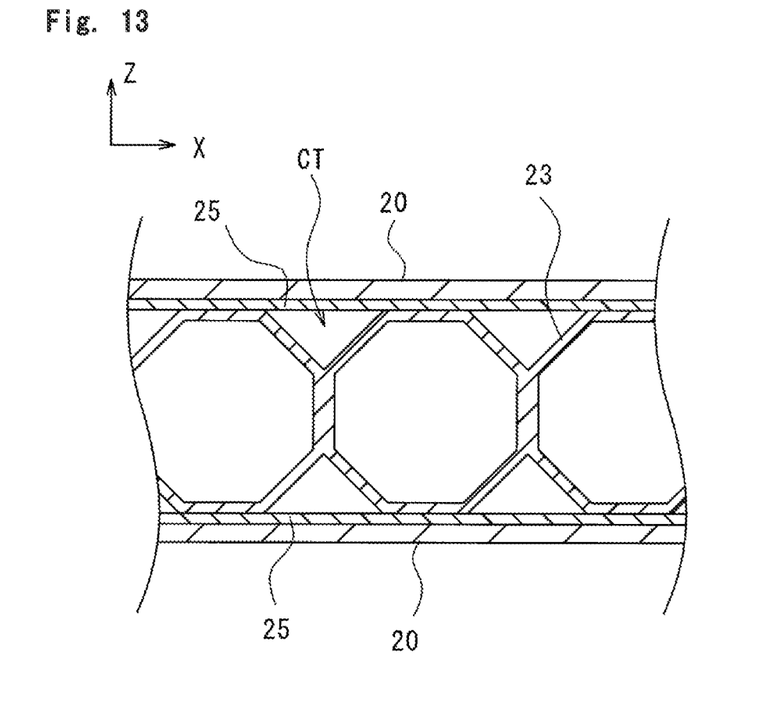
FIG. 13 is a cross-sectional view perpendicular to the vehicle width direction illustrating the side sill portion in the third modification of the reinforcing member.

With reference to FIGS. 12 and 13, in the present modification, the reinforcing member 23 is disposed so as to be filled inside the side sill 20. The upper surface and the lower surface of the reinforcing member 23 are bonded to the inner surface of the inner member 22 through a panel member 25 by spot welding or the like. Alternatively, the upper surface and the lower surface of the reinforcing member 23 may be bonded to the inner surface of the outer member 21 through the panel member 25 by spot welding or the like.

According to the present modification, the reinforcing member 23 is filled inside the side sill 20 to effectively reinforce the side sill 20. Further, the bracket 24 (see FIG. 5) for fixing the reinforcing member 23 can be omitted.

(Fourth Modification)

Figure 14:
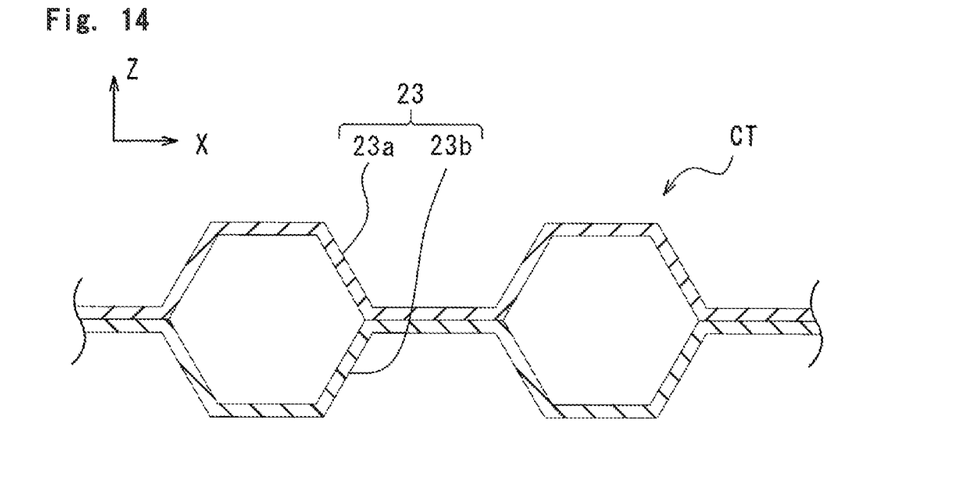
FIG. 14 is a cross-sectional view perpendicular to the vehicle width direction illustrating a reinforcing member in a fourth modification of the reinforcing member.

With reference to FIG. 14, in the present modification, the reinforcing member 23 is configured by attaching and bonding two plate members 23a and 23b made of aluminum alloy or steel. Each of the two plate members 23a and 23b is bent into a continuous hat shape. In the present modification, the closed cross-sectional shape is a regular hexagonal shape. A bonding method and a fixing method for the reinforcing member 23 are not particularly limited, and any method as described in the above embodiment and modifications can be adopted.

According to the present modification, the reinforcing member 23 can be configured with the plate members 23a and 23b other than the extruded material as in the above embodiment. Therefore, the reinforcing member 23 can be easily manufactured to improve versatility of the reinforcing member 23.

(Fifth Modification)

Figure 15:
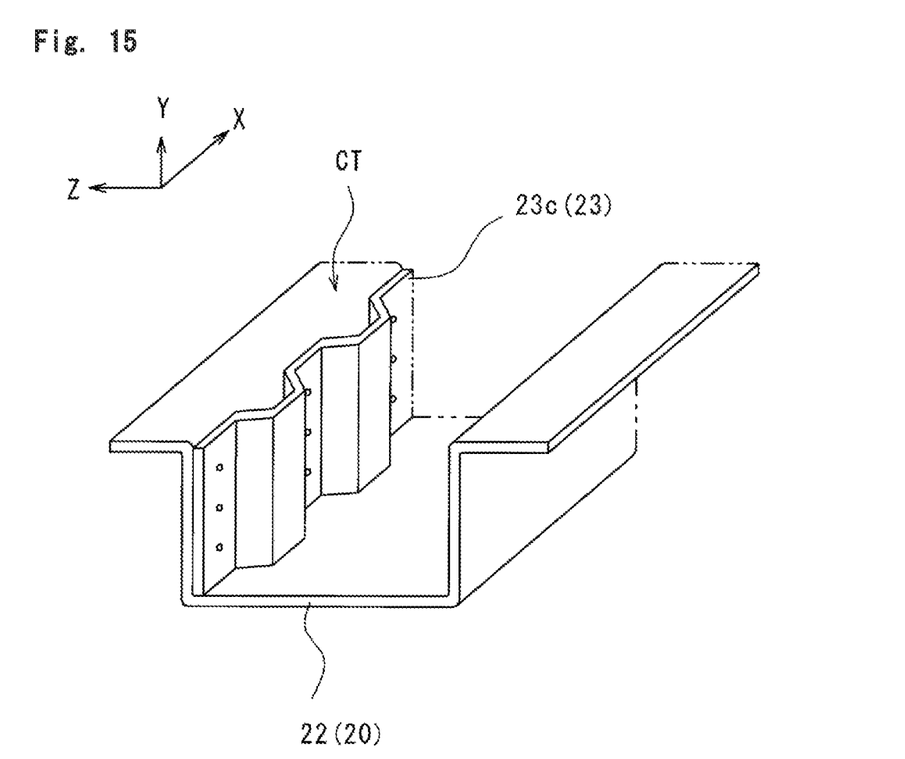
FIG. 15 is a cross-sectional view perpendicular to the vehicle front-rear direction illustrating a side sill portion in a fifth modification of the reinforcing member.

With reference to FIG. 15, in the present modification, the reinforcing member 23 is formed of one plate member 23c having continuous hat-shaped. The reinforcing member 23 is attached to the inner surface of the inner member 22, and is bonded to the inner surface of the inner member 22 by spot welding or the like. In the present modification, the continuous tubular structure CT is configured with the reinforcing member 23 and the inner member 22 (side sill 20). In the present modification, the closed cross-sectional shape of the continuous tubular structure CT viewed from the vehicle width direction is a trapezoid. In FIG. 15, illustration of the outer member 21 is omitted. Alternatively, the reinforcing member 23 may be attached to the inner surface of the outer member 21 and bonded to the inner surface of the outer member 21 by spot welding or the like. In this case, the continuous tubular structure CT is configured with the reinforcing member 23 and the outer member 21 (side sill 20).

According to the present modification, as compared with the case where the continuous tubular structure CT is configured with the reinforcing member 23 alone, a design restriction on the reinforcing member 23 is reduced. For example, since the reinforcing member 23 is formed of one plate member 23c, any material can be used.

Although the specific embodiments of the present invention and the modifications thereof have been described above, the present invention is not limited to the above embodiments, and various modifications can be made within the scope of the present invention. For example, individual modifications may be implemented in combination.

The invention claimed is:

1. A vehicle body structure comprising:
    a battery disposed in a lower central part of a vehicle body;
    a side sill extending in a vehicle front-rear direction and disposed outside the battery in a vehicle width direction, the side sill being hollow; and
    a reinforcing member configuring at least a part of a continuous tubular structure formed inside the side sill, wherein
    the continuous tubular structure has a shape in which a plurality of closed cross sections each having a polygonal shape are continuously arranged as viewed from the vehicle width direction;
    each of the plurality of closed cross sections is a polygon having a pair of opposing sides extending in the vehicle width direction and a height;
    adjacent pairs of the polygons share one of the opposing sides; and
    the continuous tubular structure consists of a single row of the polygons with said height extending in the vehicle front-rear direction.

2. The vehicle body structure according to claim 1, wherein the reinforcing member forms the plurality of closed cross sections by a single component.

3. The vehicle body structure according to claim 2, wherein each of the plurality of closed cross sections is a polygon of a hexagon or more.

4. The vehicle body structure according to claim 3, wherein each of the plurality of closed cross sections is an even-numbered polygon.

5. The vehicle body structure according to claim 2, wherein the reinforcing member is an extruded material of 6000 series or 7000 series aluminum alloy.

6. The vehicle body structure according to claim 3, wherein the reinforcing member is formed by bonding a plate member of aluminum alloy or steel.

7. The vehicle body structure according to claim 1, wherein
    the reinforcing member is bonded to an inner surface of the side sill, and
    the continuous tubular structure is configured with the reinforcing member and the side sill.

8. The vehicle body structure according to claim 1, wherein each of the shared opposing sides is thicker than the remainder of the sides of each polygon.

* * * * *